United States Patent
Zhang et al.

(10) Patent No.: US 9,344,919 B2
(45) Date of Patent: *May 17, 2016

(54) METHOD AND APPARATUS FOR ACCESSING A RANDOM ACCESS CHANNEL BY SELECTIVELY USING DEDICATED OR CONTENTION-BASED PREAMBLES DURING HANDOVER

(71) Applicant: INTERDIGITAL PATENT HOLDINGS, INC., Wilmington, DE (US)

(72) Inventors: Guodong Zhang, Syosset, NY (US); Jin Wang, Princeton, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,951

(22) Filed: Jan. 31, 2014

(65) Prior Publication Data

US 2014/0146790 A1 May 29, 2014

Related U.S. Application Data

(60) Provisional application No. 61/033,676, filed on Mar. 4, 2008.

(51) Int. Cl.
*H04W 74/08* (2009.01)
*H04W 36/00* (2009.01)
(Continued)

(52) U.S. Cl.
CPC ........ *H04W 36/0005* (2013.01); *H04W 74/004* (2013.01); *H04W 74/0833* (2013.01); *H04W 74/0866* (2013.01); *H04W 36/08* (2013.01); *H04W 88/08* (2013.01)

(58) Field of Classification Search
CPC ............ H04W 74/08; H04W 72/0406; H04W 74/004; H04W 74/0866; H04W 84/12; H04W 74/0816; H04W 74/04; H04W 72/04; H04W 88/08; H04W 76/00; H04W 80/04; H04W 36/18; H04W 36/0011; H04W 36/14; H04W 36/08; H04W 36/005; H04W 74/0833
USPC .............. 370/329, 331, 431, 310.2, 328, 338, 370/395.4; 455/436
See application file for complete search history.

(56) References Cited

U.S. PATENT DOCUMENTS 5,692,184 A 11/1997 Ardoin et al.
5,872,774 A 2/1999 Wheatley, III et al.
(Continued)

FOREIGN PATENT DOCUMENTS

AU 2010200888 B2 3/2014
CN 1612635 A 5/2005
(Continued)

OTHER PUBLICATIONS

China Mobile, "Overload handling for Non-contention based RACH," 3GPP TSG-RAN WG2#61, R2-080751 (Feb. 11-15, 2008).
(Continued)

*Primary Examiner* — Warner Wong
(74) *Attorney, Agent, or Firm* — Condo Roccia Koptiw LLP

(57) ABSTRACT

A method and apparatus for accessing a random access channel (RACH) during handover are disclosed. A handover procedure is initiated and a maximum handover interruption timer is activated. A dedicated preamble is transmitted in an attempt to access the RACH on a condition that the dedicated preamble is reserved in a current random access opportunity and the maximum handover interruption timer has not expired. A contention-based preamble is transmitted in an attempt to access the RACH on a condition that a dedicated preamble is not reserved in a current random access opportunity. If the maximum handover interruption timer has expired, a contention-based preamble is transmitted in an attempt to access the RACH.

25 Claims, 3 Drawing Sheets

(51) Int. Cl.
*H04W 74/00* (2009.01)
*H04W 88/08* (2009.01)
*H04W 36/08* (2009.01)

(56) References Cited

U.S. PATENT DOCUMENTS

| | | |
|---|---|---|
| 6,594,240 B1 | 7/2003 | Chuah et al. |
| 7,003,303 B2 | 2/2006 | Khawand et al. |
| 7,167,709 B2 | 1/2007 | Schwarz et al. |
| 7,525,941 B2 | 4/2009 | Islam et al. |
| 7,804,799 B2 | 9/2010 | Venkatachalam et al. |
| 7,852,805 B2 | 12/2010 | Kahtava et al. |
| 7,903,818 B2 | 3/2011 | Park et al. |
| 7,979,769 B2 | 7/2011 | Chun et al. |
| 8,000,305 B2 * | 8/2011 | Tan et al. ............. 370/335 |
| 8,107,950 B2 | 1/2012 | Amirijoo et al. |
| 8,111,763 B2 | 2/2012 | Ma et al. |
| 8,131,295 B2 | 3/2012 | Wang et al. |
| 8,169,986 B2 | 5/2012 | Jeong et al. |
| 8,331,326 B2 | 12/2012 | Wang et al. |
| 8,345,654 B2 * | 1/2013 | Parkvall et al. ............. 370/342 |
| 8,712,415 B2 * | 4/2014 | Zhang ............. H04W 36/0055 370/310.2 |
| 8,797,989 B2 * | 8/2014 | Lee ............. 370/329 |
| 8,971,349 B2 * | 3/2015 | Park ............. H04W 74/0833 370/336 |
| 2002/0089734 A1 | 7/2002 | Meehan et al. |
| 2003/0016698 A1 | 1/2003 | Chang et al. |
| 2003/0153275 A1 | 8/2003 | Oh et al. |
| 2004/0052229 A1 | 3/2004 | Terry et al. |
| 2004/0082356 A1 | 4/2004 | Walton et al. |
| 2004/0170179 A1 | 9/2004 | Johansson et al. |
| 2004/0174845 A1 | 9/2004 | Koo et al. |
| 2004/0185853 A1 | 9/2004 | Kim et al. |
| 2004/0192320 A1 | 9/2004 | Khawand et al. |
| 2004/0208160 A1 | 10/2004 | Petrovic et al. |
| 2005/0047366 A1 * | 3/2005 | Ghosh et al. ............. 370/329 |
| 2005/0053029 A1 | 3/2005 | Lee et al. |
| 2005/0094600 A1 | 5/2005 | Zhang et al. |
| 2005/0096050 A1 | 5/2005 | Hidaka |
| 2005/0101299 A1 | 5/2005 | Farnsworth |
| 2005/0282549 A1 | 12/2005 | Kim et al. |
| 2006/0126570 A1 * | 6/2006 | Kim et al. ............. 370/335 |
| 2006/0183429 A1 | 8/2006 | Anderson |
| 2006/0209798 A1 | 9/2006 | Oikarinen et al. |
| 2006/0223532 A1 | 10/2006 | Liu et al. |
| 2007/0047493 A1 | 3/2007 | Park et al. |
| 2007/0206531 A1 | 9/2007 | Pajukoski et al. |
| 2008/0026759 A1 | 1/2008 | Sawamoto |
| 2008/0043771 A1 | 2/2008 | Cho et al. |
| 2008/0072269 A1 | 3/2008 | Malladi et al. |
| 2008/0076405 A1 | 3/2008 | Jen |
| 2008/0102896 A1 | 5/2008 | Wang et al. |
| 2008/0159334 A1 * | 7/2008 | Venkatachalam et al. .... 370/479 |
| 2008/0187027 A1 | 8/2008 | Malladi |
| 2008/0227453 A1 | 9/2008 | Somasundaram et al. |
| 2008/0232304 A1 | 9/2008 | Mooney et al. |
| 2008/0232317 A1 | 9/2008 | Jen |
| 2008/0233941 A1 * | 9/2008 | Jen ............. 455/418 |
| 2008/0242292 A1 | 10/2008 | Koskela et al. |
| 2008/0254800 A1 | 10/2008 | Chun et al. |
| 2008/0261600 A1 | 10/2008 | Somasundaram et al. |
| 2008/0267127 A1 | 10/2008 | Narasimha et al. |
| 2008/0267131 A1 | 10/2008 | Kangude et al. |
| 2008/0280594 A1 | 11/2008 | Voyer et al. |
| 2008/0285539 A1 | 11/2008 | Tiedemann, Jr. et al. |
| 2008/0310395 A1 | 12/2008 | Kashima |
| 2009/0086676 A1 | 4/2009 | Meylan et al. |
| 2009/0101299 A1 | 4/2009 | Wanke et al. |
| 2009/0103501 A1 | 4/2009 | Farrag et al. |
| 2009/0109838 A1 | 4/2009 | Kuo |
| 2009/0129335 A1 | 5/2009 | Lee et al. |
| 2009/0147768 A1 | 6/2009 | Ji et al. |
| 2009/0168728 A1 | 7/2009 | Pani et al. |
| 2009/0213771 A1 | 8/2009 | Celentano et al. |
| 2009/0213818 A1 | 8/2009 | Park et al. |
| 2009/0238141 A1 | 9/2009 | Damnjanovic et al. |
| 2009/0239539 A1 | 9/2009 | Zhang et al. |
| 2009/0247161 A1 | 10/2009 | Pani et al. |
| 2009/0274086 A1 | 11/2009 | Petrovic et al. |
| 2009/0309921 A1 | 12/2009 | Ohyama et al. |
| 2010/0027466 A1 | 2/2010 | Mustapha |
| 2010/0074218 A1 | 3/2010 | Cai et al. |
| 2010/0113033 A1 | 5/2010 | Qiu et al. |
| 2010/0118788 A1 | 5/2010 | Ohta et al. |
| 2010/0182974 A1 | 7/2010 | Barraclough et al. |
| 2010/0202402 A1 | 8/2010 | Dalsgaard et al. |
| 2010/0210255 A1 | 8/2010 | Amirijoo et al. |
| 2010/0220713 A1 | 9/2010 | Tynderfeldt et al. |
| 2010/0238799 A1 | 9/2010 | Sebire |
| 2010/0260140 A1 | 10/2010 | Zhu |
| 2010/0265854 A1 * | 10/2010 | Baldemair et al. ............. 370/280 |
| 2010/0279695 A1 | 11/2010 | Amirijoo et al. |
| 2010/0284376 A1 | 11/2010 | Park et al. |
| 2011/0149942 A1 | 6/2011 | Ko et al. |
| 2012/0064897 A1 | 3/2012 | Amirijoo et al. |
| 2012/0213157 A1 | 8/2012 | Jeong et al. |
| 2013/0064224 A1 | 3/2013 | Wang et al. |

FOREIGN PATENT DOCUMENTS

| | | |
|---|---|---|
| CN | 1984452 A | 6/2007 |
| CN | 101069448 A | 11/2007 |
| EP | 0568212 B1 | 9/1997 |
| EP | 1058417 A2 | 12/2000 |
| EP | 1058471 A2 | 12/2000 |
| EP | 1117269 A1 | 7/2001 |
| EP | 1199904 A1 | 4/2002 |
| EP | 1408658 A2 | 4/2004 |
| EP | 1 511 246 | 3/2005 |
| EP | 1799003 A1 | 6/2007 |
| EP | 1909520 A1 | 4/2008 |
| EP | 1909523 A1 | 4/2008 |
| GB | 2353671 A | 2/2001 |
| IL | 194081 | 6/2009 |
| JP | 10-23501 A | 1/1998 |
| JP | 10-247806 A | 9/1998 |
| JP | 2003-069469 A | 3/2003 |
| JP | 2003-523138 A | 7/2003 |
| JP | 2003-532138 A | 10/2003 |
| JP | 2005-539468 A | 12/2005 |
| JP | 2006-504335 A | 2/2006 |
| JP | 2006-515484 A | 5/2006 |
| JP | 2007-503740 A | 2/2007 |
| JP | 2009-500894 A | 1/2009 |
| JP | 2009-509431 A | 3/2009 |
| JP | 2009-519636 A | 5/2009 |
| JP | 2010-023501 A | 2/2010 |
| JP | 2010-506445 A | 2/2010 |
| JP | 5023150 B2 | 9/2012 |
| KR | 2005-0116497 A | 12/2005 |
| RU | 2003122285 A | 2/2005 |
| RU | 2292669 C2 | 1/2007 |
| RU | 2305900 C2 | 9/2007 |
| TW | M340666 U | 9/2008 |
| WO | WO 01/60017 A1 | 8/2001 |
| WO | WO 01/72081 A1 | 9/2001 |
| WO | WO 01/76304 A1 | 10/2001 |
| WO | WO 03/043237 A1 | 5/2003 |
| WO | WO 2004/025778 A1 | 3/2004 |
| WO | WO 2004/079948 A1 | 9/2004 |
| WO | WO 2004/080102 A1 | 9/2004 |
| WO | WO 2005/006596 A1 | 1/2005 |
| WO | WO 2005/020617 A1 | 3/2005 |
| WO | WO 2005/022814 A1 | 3/2005 |
| WO | WO 2005/029642 A1 | 3/2005 |
| WO | WO 2005/032199 A1 | 4/2005 |
| WO | WO 2005/120183 A2 | 12/2005 |
| WO | WO 2005/122704 A2 | 12/2005 |
| WO | WO 2006/061671 A1 | 6/2006 |
| WO | WO 2006/073225 A2 | 7/2006 |
| WO | WO 2007/000722 A2 | 1/2007 |
| WO | WO 2007/038994 A2 | 4/2007 |
| WO | WO 2007/066882 A1 | 6/2007 |

(56) References Cited

FOREIGN PATENT DOCUMENTS

| WO | WO 2007/068304 A1 | 6/2007 |
|---|---|---|
| WO | WO 2007/108959 A1 | 9/2007 |
| WO | WO 2007/144760 A2 | 12/2007 |
| WO | WO 2007/149509 A2 | 12/2007 |
| WO | WO 2008/023927 A2 | 2/2008 |
| WO | WO 2008/040447 A1 | 4/2008 |
| WO | WO 2008/087524 A2 | 7/2008 |
| WO | WO 2008/131401 A1 | 10/2008 |
| WO | WO 2009/117575 A1 | 9/2009 |
| WO | WO 2010/002692 A1 | 1/2010 |

OTHER PUBLICATIONS

Ericsson, "On the details of the dedicated preamble at intra-LTE handover," 3GPP TSG-RAN WG2 #58-bis, R2-072549 (Jun. 25-29, 2007).

Ghosh et al., "Random Access Design for UMTS Air-Interface Evolution," IEEE Vehicular Technology Conference, pp. 1041-1045 (Apr. 2007).

Third Generation Partnership Project, "Technical Specification Group Radio Access Network; Evolved Universal Terrestrial Radio Access (E-UTRA); Medium Access Control (MAC) protocol specification (Release 8)," 3GPPP TS 36.321 V8.0.0 (Dec. 2007).

Third Generation Partnership Project, "Technical Specification Group Radio Access Network; Evolved Universal Terrestrial Radio Access (E-UTRA); Medium Access Control (MAC) protocol specification (Release 8)," 3GPPP TS 36.321 V8.4.0 (Dec. 2008).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.1.0 (Nov. 2007).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.3.0 (Dec. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.0.0 (Dec. 2007).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).

3rd Generation Partnership Project (3GPP), R1-060773, "Text Proposal of Prioritizing Non-Synchronized Random Access in E-UTRA Uplink", ITRI, 3GPP TSG-RAN WG1 Meeting #44bis, Athens, Greece, Mar. 27-31, 2006, 6 pages.

3rd Generation Partnership Project (3GPP), R1-072648, "LS on LTE Latency Analysis", RAN WG2, 3GPP TSG RAN WG1 Meeting #49bis, Orlando, Florida, Jun. 25-29, 2007, 10 pages.

3rd Generation Partnership Project (3GPP), R2-052787, "Channels for Random Access", CATT, 3GPP TSG RAN WG2 Meeting #49, Seoul, Korea, Nov. 7-11, 2005, pp. 1-2.

3rd Generation Partnership Project (3GPP), R2-060078, "Handover Procedure for LTE_ACTIVE UEs", Samsung, 3GPP TSG-RAN WG2 #50 Meeting, Sophia-Antipolis, France, Jan. 9-13, 2006, pp. 6-14.

3rd Generation Partnership Project (3GPP), R2-060095, "Real-Time Services Handover Support within E-UTRAN", Huawei, 3GPP TSG RAN2 #50, Sophia-Antipolis, France, Jan. 9-13, 2006, pp. 1-4.

3rd Generation Partnership Project (3GPP), R2-060821, "RACH Message Structure", Nokia, Joint 3GPP TSG-RAN WG1 & WG2 Meeting on LTE, Athens, Greece, Mar. 27-31, 2006, 2 pages.

3rd Generation Partnership Project (3GPP), R2-061135, "Intra-LTE Handover Operation", Nokia, NTT DoCoMo, 3GPP TSG-RAN WG2 Meeting #53, Shanghai, PRC, May 8-13, 2006, 3 pages.

3rd Generation Partnership Project (3GPP), R2-061169, "Inter-ENB handover: Data Unit Forwarding for DL ?", Samsung, 3GPP TSG-RAN2 Meeting #53, Shanghai, China, May 8-12, 2006, 4 pages.

3rd Generation Partnership Project (3GPP), R2-061196, "Cell Switching in LTE_Active State", Qualcomm Europe, 3GPP TSG-RAN WG2 Meeting #53, Shanghai, China, May 8-12, 2006, 5 pages.

3rd Generation Partnership Project (3GPP), R2-061199, "Discussion on eNode B Change Procedure", Qualcomm Europe, 3GPP TSG-RAN WG 2 Meeting #53, Shanghai, China, May 8-12, 2006, pp. 1-7.

3rd Generation Partnership Project (3GPP), R2-061552, "Discussion on Initial Access to LTE Cell", LG Electronics, TSG-RAN Working Group 2 #53, Shanghai, China, May 8-12, 2006, 6 pages.

3rd Generation Partnership Project (3GPP), R2-061928, "RRC Re-Establishment Procedure", NTT DoCoMo, 3GPP TSG-RAN WG2 Ad-Hoc on LTE, Cannes, France, Jun. 27-30, 2006, 6 pages.

3rd Generation Partnership Project (3GPP), R2-062809, "Non-Contention based Handover Procedure on RACH Channel", ZTE, TSG-RAN Working Group 2 Meeting #55, Seoul, Korea, Oct. 9-13, 2006, 4 pages.

3rd Generation Partnership Project (3GPP), R2-070167, "Neighboring Cell Information", Samsung, 3GPP TSG-RAN WG2 Meeting #56bis, Sorrento, Italy, Jan. 15-19, 2007, 3 pages.

3rd Generation Partnership Project (3GPP), R2-070646, "Contention-Free Intra-LTE Handover", IPWireless, 3GPP TSG RAN WG2 #57, St. Louis, Missouri, USA, Feb. 12-16, 2007, pp. 1-4.

3rd Generation Partnership Project (3GPP), R2-071229, "Radio Link Failure and Context Recovery", Nokia, 3GPP TSG-RAN WG2 Meeting #57bis, St. Julian's, Malta, Mar. 26-30, 2007, 3 pages.

3rd Generation Partnership Project (3GPP), R2-071359, "Radio Link Failure", Ericsson, 3GPP TSG-RAN WG2 #57bis, St Julian, Malta, Mar. 26-30, 2007, pp. 1-4.

3rd Generation Partnership Project (3GPP), R2-072193, "LS on LTE Latency Analysis", RAN WG2, 3GPP TSG-RAN WG2 Meeting #58, Kobe, Japan, May 7-11, 2007, 12 pages.

3rd Generation Partnership Project (3GPP), R2-073992, "Delivery of HO Command", Qualcomm Europe, 3GPP TSG-RAN WG 2 Meeting #59-bis, Shanghai, China, Oct. 8-12, 2007, pp. 1-3.

3rd Generation Partnership Project (3GPP), R2-074312, "Need to Obtain the Target SFN Prior to HO", LG Electronics, 3GPP TSG-RAN#59bis WG 2 LTE, Shanghai, China, Oct. 8-12, 2007, 2 pages.

3rd Generation Partnership Project (3GPP), R2-082903, "Miscellaneous Clarifications/Corrections", Rapporteur (Samsung), 3GPP TSG-RAN2#62 Meeting, Kansas City, U.S.A, May 5-9, 2008, 177 pages.

3rd Generation Partnership Project (3GPP), R2-082948, "SIB Reading after Handover", Panasonic, 3GPP TSG RAN WG2 RRC Ad Hoc, Sophia-Antipolis, France, Jun. 5-6, 2008, 4 pages.

3rd Generation Partnership Project (3GPP), R2-082982, "Measurement Related Actions during Handover", Huawei, 3GPP TSG RAN WG2-RRC Ad-Hoc, Sophia-Antipolis, France, Jun. 5-6, 2008, 4 pages.

3rd Generation Partnership Project (3GPP), R3-060009, "The Handover Procedure for the LTE_ACTIVE Mobility", Panasonic, TSG-RAN Working Group 3 Meeting #50, Sophia-Antipolis, France, Jan. 10-12, 2006, 4 pages.

3rd Generation Partnership Project (3GPP), TR 25.912 V0.1.4, "Technical Specification Group Radio Access Network, Feasibility Study for Evolved UTRA and UTRAN (Release 7)", May 2006, pp. 1-38.

3rd Generation Partnership Project (3GPP), TR 25.912 V0.1.7, "Technical Specification Group Radio Access Network, Feasibility Study for Evolved UTRA and UTRAN (Release 7)", Jun. 2006, pp. 1-64.

3rd Generation Partnership Project (3GPP), TR 25.912 V0.2.0, "Technical Specification Group Radio Access Network, Feasibility Study for Evolved UTRA and UTRAN (Release 7)", Jun. 2006, pp. 1-57.

(56) References Cited

OTHER PUBLICATIONS

3rd Generation Partnership Project (3GPP), TR 25.912 V7.1.0, "Technical Specification Group Radio Access Network, Feasibility Study for Evolved Universal Terrestrial Radio Access (UTRA) and Universal Terrestrial Radio Access Network (UTRAN) (Release 7)", Sep. 2009, pp. 1-57.

3rd Generation Partnership Project (3GPP), TR R3.018 V0.4.0, "Technical Specification Group Radio Access Network, Evolved UTRA and UTRAN, Radio Access Architecture and Interfaces (Release 7)", May 2006, pp. 1-51.

3rd Generation Partnership Project (3GPP), TS 25.331 V6.7.0, "Technical Specification Group Radio Access Network, Radio Resource Control (RRC), Protocol Specification (Release 6)", Sep. 2005, pp. 1-1166.

3rd Generation Partnership Project (3GPP), TS 25.331 V6.9.0, "Technical Specification Group Radio Access Network, Radio Resource Control (RRC), Protocol Specification (Release 6)", Mar. 2006, pp. 1-1209.

3rd Generation Partnership Project (3GPP), TS 25.331 V8.0.0, "Technical Specification Group Radio Access Network, Radio Resource Control (RRC), Protocol Specification (Release 8)", Sep. 2007, pp. 1-1460.

3rd Generation Partnership Project (3GPP), TS 36.300 V8.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2007, pp. 1-82.

3rd Generation Partnership Project (3GPP), TS 36.300 V8.4.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2008, pp. 1-126.

3rd Generation Partnership Project (3GPP), TS 36.300 V8.5.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", May 2008, pp. 1-134.

3rd Generation Partnership Project (3GPP), TS 36.300 V8.8.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2009, pp. 1-157.

3rd Generation Partnership Project (3GPP), TS 36.300 V8.9.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Jun. 2009, pp. 1-159.

3rd Generation Partnership Project (3GPP), TS 36.300 V9.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Jun. 2009, pp. 1-157.

3rd Generation Partnership Project (3GPP), TS 36.331 V8.1.0, "Technical Specification Group Radio Access Network, Evolved Universal Terrestrial Radio Access (E-UTRA) Radio Resource Control (RRC), Protocol Specification (Release 8)", Mar. 2008, pp. 1-122.

3rd Generation Partnership Project (3GPP), TS 36.331 V8.2.0, "Technical Specification Group Radio Access Network, Evolved Universal Terrestrial Radio Access (E-UTRA) Radio Resource Control (RRC), Protocol Specification (Release 8)", May 2008, pp. 1-151.

3rd Generation Partnership Project (3GPP), TS 36.331 V8.5.0, "Technical Specification Group Radio Access Network, Evolved Universal Terrestrial Radio Access (E-UTRA) Radio Resource Control (RRC), Protocol Specification (Release 8)", Mar. 2009, pp. 1-204.

3rd Generation Partnership Project (3GPP), TS 36.331 V8.6.0, "Technical Specification Group Radio Access Network, Evolved Universal Terrestrial Radio Access (E-UTRA) Radio Resource Control (RRC), Protocol Specification (Release 8)", Jun. 2009, pp. 1-207.

European Telecommunications Standards Institute (ETSI), TS 136 300 V8.0.0, "Universal Mobile Telecommunications System (UMTS), Evolved Universal Terrestrial Radio Access (E-UTRA) and Evolved Universal Terrestrial Radio Access (E-UTRAN), Overall Description, Stage 2 (3GPP TS 36.300 Version 8.0.0 Release 8)", Mar. 2007, pp. 1-84.

European Telecommunications Standards Institute (ETSI), TS 136 300 V8.4.0, "Evolved Universal Terrestrial Radio Access (E-UTRA) and Evolved Universal Terrestrial Radio Access (E-UTRAN), Overall Description, Stage 2 (3GPP TS 36.300 Version 8.4.0 Release 8)", Apr. 2008, 5 pages.

Festag, A., "Optimization of Handover Performance by Link Layer Triggers in IP-Based Networks: Parameters, Protocol Extensions and APIs for Implementation", Telecommunication Networks Group, TKN Technical Report TKN-02-014, Version: 1, Aug. 2002, 32 pages.

Koodli et al., "A Context Transfer Protocol for Seamless Mobility", Communication Systems Laboratory, Nokia Research Center, Seamoby Working Group, Aug. 30, 2002, pp. 1-35.

* cited by examiner

METHOD AND APPARATUS FOR ACCESSING A RANDOM ACCESS CHANNEL BY SELECTIVELY USING DEDICATED OR CONTENTION-BASED PREAMBLES DURING HANDOVER

CROSS REFERENCE TO RELATED APPLICATIONS

This application is a continuation of U.S. patent application Ser. No. 12/392,235, filed Feb. 25, 2009, now U.S. Pat. No. 8,649,353, which claims the benefit of U.S. Provisional Application No. 61/033,676 filed Mar. 4, 2008, the contents of all of which are hereby incorporated by reference as if fully set forth herein.

FIELD OF INVENTION

This application is related to wireless communications.

BACKGROUND

In a Third Generation Partnership Project (3GPP) Long Term Evolution (LTE) wireless communication system, when a wireless transmit/receive unit (WTRU) performs handover to a target cell, the WTRU uses a dedicated preamble to access a network. A preamble is a signal sent from the WTRU to an evolved Node-B (eNB) to detect timing misalignment in the uplink (UL) during a handover procedure. Accordingly, the target cell needs to reserve a dedicated preamble for the WTRU. However, a non-contention based random access channel (RACH), used by the eNB to provide configuration information of the dedicated preamble, will become overloaded when a large number of WTRUs handover to the same target cell in a short amount of time. Because of this overloading of the RACH, there is a need for a more efficient mechanism by which the dedicated preamble is used during handover.

SUMMARY

The method and apparatus disclosed herein allows for an efficient usage of a dedicated preamble to access a RACH in evolved universal terrestrial radio access (E-UTRA) during handover. The WTRU may use a dedicated preamble in pre-reserved (or preconfigured) frames, but not in every frame. Alternatively, the WTRU may use contention-based preambles in other random access opportunities when a dedicated preamble is not reserved, or a RACH access attempt does not succeed using the dedicated preamble.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an evolved Node-B (eNB), a site controller, an access point (AP), or any other type of interfacing device capable of operating in a wireless environment.

The method and apparatus disclosed herein allows for an efficient usage of a dedicated preamble for handover performed by WTRUs in E-UTRA. The WTRU may use a dedicated preamble in pre-reserved (or preconfigured) frames, but not in every frame. Alternatively, the WTRU may use contention-based preambles in other random access opportunities when a dedicated preamble is not reserved.

Rather than reserving a dedicated preamble for a handover WTRU in every random access opportunity, (e.g., every 10 ms), the eNB will reserve a dedicated preamble N out of M random access opportunities, where the parameter M is defined as the period of a reserved dedicated preamble. A random access opportunity is a time period when a RACH may be accessed. In such an instance, the preferred value of N is one.

Figure 1:
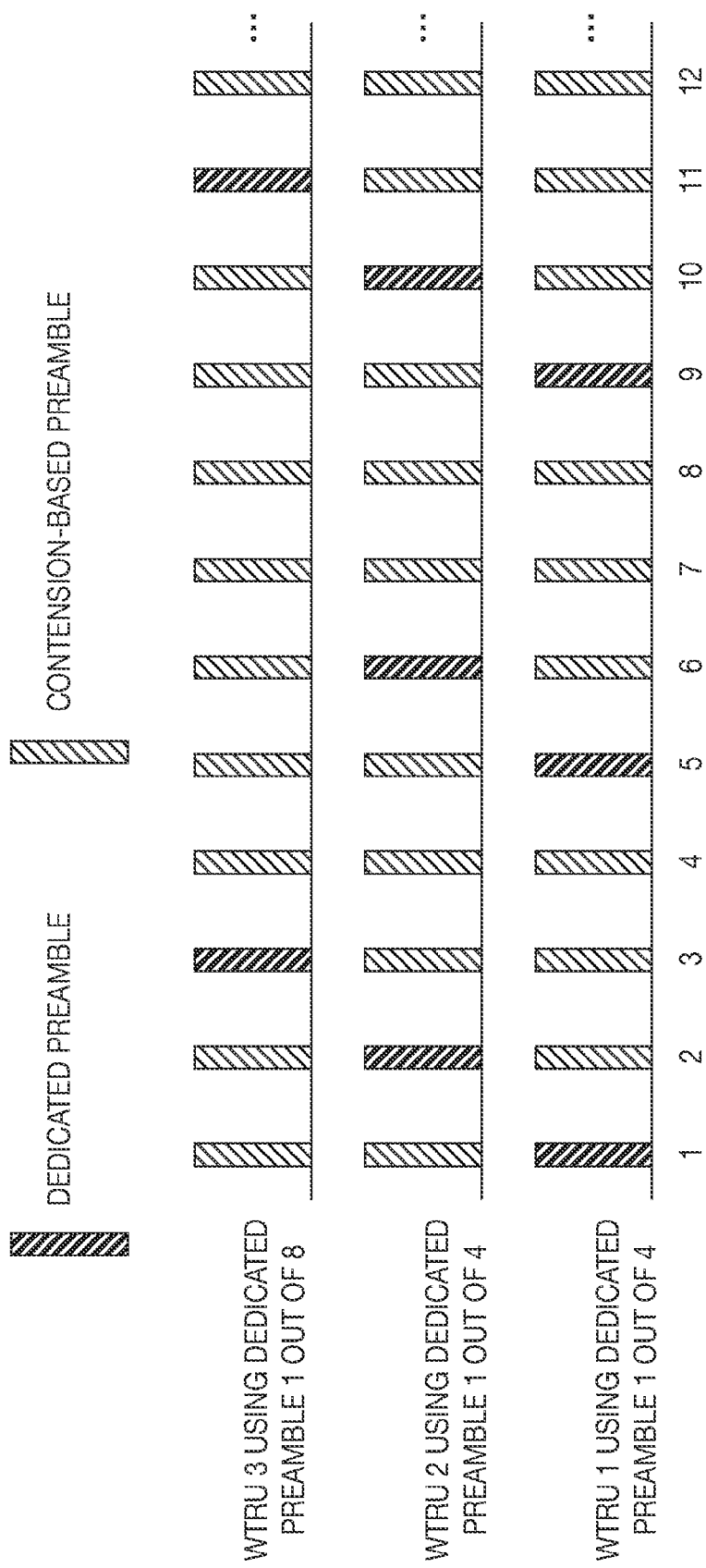
FIG. 1 shows an example of a plurality of WTRUs sharing one dedicated preamble during different reserved dedicated preamble periods.

As is shown in FIG. 1, such a value facilitates the eNB to interleave several WTRUs sharing one dedicated preamble over the time domain. WTRU 1 only uses the dedicated preamble in a first random access opportunity out of every 4 random access opportunities. WTRU 2 only uses the dedicated preamble in a second random access opportunity out of every 4 random access opportunities. WTRU 3 only uses the dedicated preamble in a third random access opportunity out of every 8 random access opportunities. Thus, a dedicated preamble is efficiently shared by 3 WTRUs in the time domain.

The network will monitor and decide the value of parameters N and M based on the load on a non-contention RACH. Although different M values may be configured, a larger period must be an integer multiple of a smaller preamble period. In this way, WTRUs with different dedicated preamble configurations may share the same preamble without collision in the time domain. An example of a preferred set of a different reserved dedicated preamble periods is M=1, 2, 4 and 8.

Figure 2:
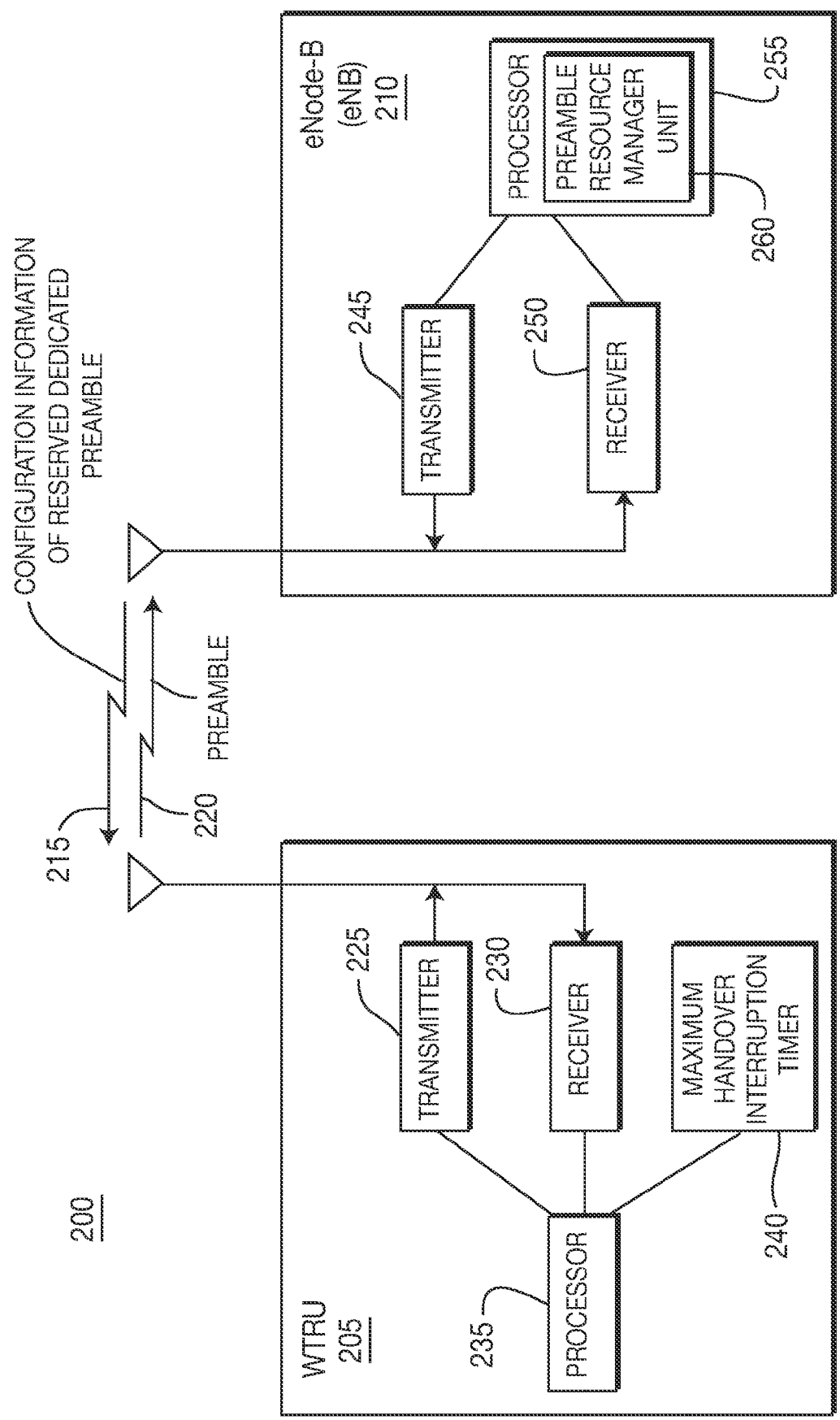
FIG. 2 is a block diagram of a wireless communication system including a WTRU and an eNB.

FIG. 2 shows a wireless communication system 200 including a WTRU 205 and an eNB 210. The eNB 210 reserves a dedicated preamble for a WTRU N out of M random access opportunities for a duration up to a maximum allowed handover interruption time. The eNB 210 may transmit reserved dedicated preamble configuration information 215 to the WTRU 205 via a handover command, when a handover decision is made, or via a special medium access control (MAC) protocol data unit (PDU). The WTRU 205 includes a transmitter 225, a receiver 230 which receives preambles from the WTRU 205, a processor 235 and a maximum handover interruption timer 240. The eNB 110 includes a transmitter 245, which is configured to transmit the reserved dedicated preamble configuration information 215, a receiver 250 which receives the preambles from the WTRU 205 and a processor 255. The processor 255 includes a preamble resource manager 260, which is used to allocate preambles to the WTRU 205.

The WTRU 205 transmits either a dedicated or contention-based preamble 220 to the eNB 210 such that the WTRU 205 can access a RACH to complete a handover procedure. If a RACH access attempt implemented by the WTRU 205 fails when using a dedicated preamble, the WTRU 205 will then use a contention-based preamble in subsequent random access opportunities until either its RACH access attempt succeeds or a random access opportunity occurs in which there is a reserved dedicated preamble.

Still referring to FIG. 2, the WTRU 200 is configured to access a RACH during handover. The processor 235 is configured to initiate handover and activate the maximum handover interruption timer 240. The transmitter is configured to transmit a dedicated preamble in an attempt to access the RACH on a condition that the dedicated preamble is reserved in a current random access opportunity and the maximum handover interruption timer has not expired, and transmit a contention-based preamble in an attempt to access the RACH on a condition that a dedicated preamble is not reserved in a current random access opportunity.

The transmitter 225 in the WTRU 200 is also configured to transmit a contention-based preamble in an attempt to access the RACH on a condition that the maximum handover interruption timer has expired. The transmitter 225 is also configured to transmit, on a condition that a failure to access a RACH has failed, a contention-based preamble in subsequent random access opportunities until a successful RACH access attempt occurs, or a random access opportunity occurs in which there is a reserved dedicated preamble.

A non-contention based procedure is used on a condition that the dedicated preamble is reserved in a current random access opportunity and the maximum handover interruption timer has not expired.

A contention-based random access procedure is used on a condition that the dedicated preamble is not reserved in a current random access opportunity and the maximum handover interruption timer has expired.

Figure 3:
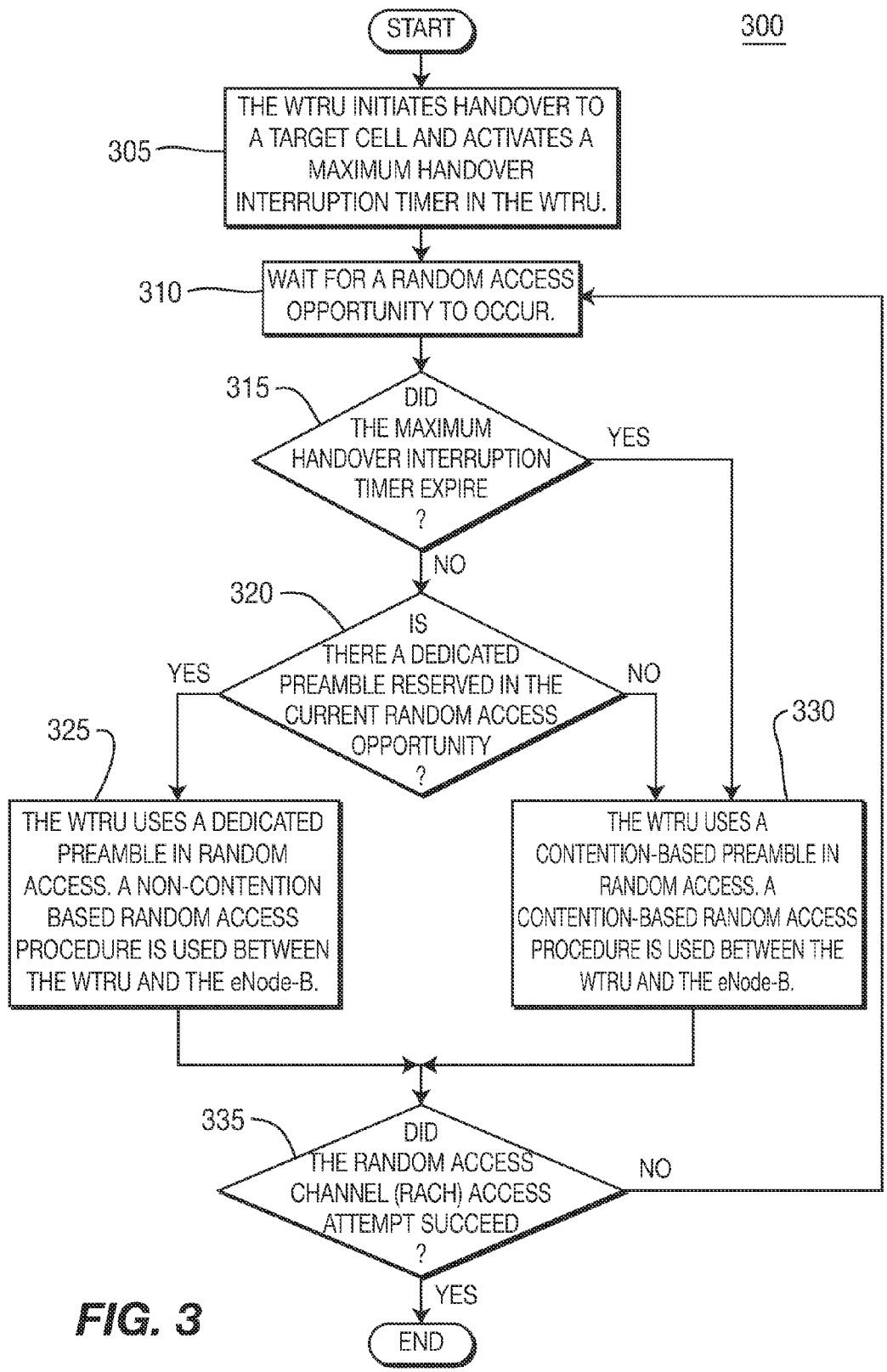
FIG. 3 is a flowchart of a procedure for using a dedicated or contention-based preamble during handover using the system of FIG. 2.

FIG. 3 is a flow diagram of a procedure 300 that uses a reserved dedicated preamble or a contention-based random access preamble during handover. Referring to FIGS. 2 and 3, the processor 235 in the WTRU 205 initiates a handover to a target cell and activates the maximum handover interruption timer 240 in the WTRU 205 (305). When a random access opportunity occurs (310), a determination is made by the processor 235 as to whether the maximum handover interruption timer 240 has expired (315). If the maximum handover interruption timer 240 has not yet expired before a random access opportunity occurs, the processor 235 determines whether there is a dedicated preamble reserved in the current random access opportunity (step 320).

If there is a reserved dedicated preamble in the current random access opportunity, the WTRU uses a dedicated preamble in random access, and a non-contention based random access procedure is used between the WTRU 205 and the eNB 210 to make a RACH access attempt (step 325). A non-contention based random access procedure is two-step random access procedure that does not involve transmission of RACH message 3 in the uplink and contention resolution in the downlink, (as compared to a contention-based one).

If a reserved dedicated preamble does not exist in the current random access opportunity, the WTRU uses a contention-based preamble in random access, and a contention based random access procedure is used between the WTRU 205 and the eNB 210 to make a RACH access attempt (step 330). A contention based random access procedure is a four-step random access procedure that involves transmission of RACH message 3 in the uplink and contention resolution in the downlink. The contention-based preamble may be randomly selected from a set of contention-based preambles.

In step 335, a determination is made as to whether the RACH access attempt succeeded. If a WTRU fails its RACH access attempt using a reserved dedicated preamble, it will use a contention-based preamble in subsequent random access opportunities until either its RACH access attempt succeeds, or a random access opportunity occurs in which there is a reserved dedicated preamble.

Due to the high success probability of RACH access using a dedicated preamble, the approach to try a RACH access attempt with alternating non-contention based and contention based RACH access attempts is preamble resource efficient.

Although the features and elements of the present method and apparatus are described in particular combinations, each feature or element may be used alone, without other features and elements of the preferred embodiments, or in various combinations with or without other features and elements of the present method and apparatus.

While the present method and apparatus has been described in terms of the preferred embodiment, other variations which are within the scope of the invention will be apparent to those skilled in the art.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a WTRU, user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A base station configured to manage random access of wireless transmit/receive units (WTRUs) in a cell, the base station comprising:
   a transmitter; and
   a processor configured to:
   transmit, via the transmitter, preamble configuration information including an indication of a dedicated preamble and a dedicated preamble period, wherein the dedicated preamble is used for random access in the cell during available random access channel (RACH) opportunities of the dedicated preamble period; and
   transmit, via the transmitter, a first dedicated preamble reservation to a first WTRU, wherein the first dedicated preamble reservation indicates a first set of the available RACH opportunities of the dedicated preamble period during which the dedicated preamble is reserved for the first WTRU.

2. The base station of claim 1, further comprising:
a receiver configured to receive the dedicated preamble from the first WTRU during a RACH opportunity selected from the first set of the available RACH opportunities of the dedicated preamble period.

3. The base station of claim 1, wherein the processor is further configured to:
transmit, via the transmitter, a second dedicated preamble reservation to a second WTRU, wherein the second dedicated preamble reservation indicates a second set of the available RACH opportunities of the dedicated preamble period different than the first set during which the dedicated preamble is reserved for the second WTRU.

4. The base station of claim 3, further comprising:
a receiver configured to receive the dedicated preamble from the second WTRU during a RACH opportunity selected from the second set of the available RACH opportunities of the dedicated preamble period.

5. The base station of claim 1, wherein the available RACH opportunities of the dedicated preamble period is an integer M number of RACH opportunities and the set of the available RACH opportunities of the dedicated preamble period is an integer N number of RACH opportunities, wherein N is less than M.

6. The base station of claim 1, wherein the preamble configuration information is common to all WTRUs of the cell, and wherein the first dedicated preamble reservation is only for the first WTRU.

7. The base station of claim 3, wherein the preamble configuration information is common to all WTRUs of the cell, and wherein the second dedicated preamble reservation is only for the second WTRU.

8. A method implemented in a wireless transmit/receive unit (WTRU), the method comprising:
receiving, via a source cell associated with a source base station, a handover command, the handover command having dedicated preamble configuration information including an indication of a dedicated preamble, a dedicated preamble period, and a dedicated preamble reservation, wherein the dedicated preamble is used for contention free random access in a target cell associated with a target base station during available random access channel (RACH) opportunities of the dedicated preamble period, and wherein the dedicated preamble reservation indicates a set of the available RACH opportunities of the dedicated preamble period during which the dedicated preamble is reserved for the WTRU;
initiating a timer in response to the handover command;
transmitting, to the target cell associated with the target base station prior to an experiration of the timer, the indicated dedicated preamble during a RACH opportunity selected from the indicated RACH opportunities for the dedicated preamble based on the dedicated preamble reservation; and
transmitting subsequent to the expiration of the timer and on a condition that RACH access using the dedicated preamble was not successful, a contention based preamble during a RACH opportunity.

9. The method of claim 8, wherein the transmitting the indicated dedicated preamble further includes transmitting the indicated dedicated preamble interleaved over a time domain with at least one other WTRU.

10. The method of claim 8, wherein the indicated dedicated preamble is not reserved for the WTRU in every frame.

11. A wireless transmit/receive unit (WTRU) comprising:
a receiver configured to receive, via a source cell associated with a source base station, a handover command, the handover command having dedicated preamble configuration information including an indication of a dedicated preamble, a dedicated preamble period, and a dedicated preamble reservation, wherein the dedicated preamble is used for contention free random access in a target cell associated with a target base station during available random access channel (RACH) opportunities of the dedicated preamble period, and wherein the dedicated preamble reservation indicates a subset set of the available RACH opportunities of the dedicated preamble period during which the dedicated preamble is reserved for the WTRU;
a timer configured to initiate in response to the handover command; and
a transmitter; and
a processor configured to:
transmit, via the transmitter to the target cell associated with the target base station prior to an expiration of the timer, the indicated dedicated preamble during a RACH opportunity selected from the indicated RACH opportunities for the dedicated preamble based on the dedicated preamble reservation; and
transmit, via the transmitter subsequent to the expiration of the timer and on a condition that RACH access using the dedicated preamble was not successful, a contention based preamble during a RACH opportunity.

12. The WTRU of claim 11, wherein the processor is further configured to transmit, via the transmitter and prior to the experiation of the timer, the indicated dedicated preamble interleaved over a time domain with at least one other WTRU.

13. The WTRU of claim 11, wherein the indicated dedicated preamble is not reserved for the WTRU in every frame.

14. A communication station configured to manage random access of a wireless transmit/receive unit (WTRU), the communication station comprising:
a transmitter; and
a processor configured to:
transmit, via the transmitter, preamble configuration information including an indication of a preamble and a preamble period, wherein the preamble is used for random access by the WTRU during a random access channel (RACH) opportunity of the preamble period, wherein the preamble period spans a plurality of RACH opportunities; and
transmit, via the transmitter, a preamble reservation to the WTRU, wherein the preamble reservation indicates a set of the plurality of RACH opportunities during which the preamble is reserved for the WTRU.

15. The communication station of claim 14, further comprising:
a receiver configured to receive the preamble from the WTRU during a RACH opportunity selected from the set of the plurality of RACH opportunities.

16. The communication station of claim 14, wherein the plurality of RACH opportunities is an integer M number of RACH opportunities and the set of the plurality of RACH opportunities is an integer N number of RACH opportunities, wherein N is less than M.

17. The communication station of claim 14, wherein the preamble configuration information is common to all WTRUs in communication with the communication station, and wherein the preamble reservation is only for the WTRU.

18. A wireless transmit/receive unit (WTRU) comprising a processor, a transmitter, and a receiver, the processor configured to:
    receive, via the receiver, a handover command, wherein the handover command comprises an indication of a dedicated random access preamble, an indication of a period of time during which the dedicated random access preamble is usable by the WTRU, and an indication of a set of random access opportunities within the period of time during which the WTRU can use the dedicated random access preamble for attempting random access;
    start a maximum handover interruption timer, wherein a length of the maximum handover interruption timer corresponds to the period of time during which the dedicated random access preamble is usable by the WTRU;
    transmit, via the transmitter, the dedicated random access preamble while the maximum handover interruption timer is running, wherein a random access opportunity within the set of random access opportunities is used for transmitting the dedicated random access preamble while the maximum handover interruption timer is running; and
    initiate a contention-based random access procedure on a condition the maximum handover interruption timer expires.

19. The WTRU of claim 18, wherein the dedicated random access preamble is used by at least one other WTRU during a random access opportunity that is not within the indicated set of random access opportunities but that is within the period of time during which the WTRU can use the dedicated random access preamble.

20. The WTRU of claim 18, wherein the indication of the set of random access opportunities indicated to the WTRU corresponds to a single random access opportunity.

21. The WTRU of claim 18, wherein the processor is further configured to transmit, via the transmitter, a random access channel (RACH) message 3 (msg3).

22. A method comprising:
    receiving a handover command, wherein the handover command comprises an indication of a dedicated random access preamble, an indication of a period of time during which the dedicated random access preamble is usable by a wireless transmit/receive unit (WTRU), and an indication of a set of random access opportunities within the period of time during which the WTRU can use the dedicated random access preamble for attempting random access;
    start a maximum handover interruption timer, wherein a length of the maximum handover interruption timer corresponds to the period of time during which the dedicated random access preamble is usable by the WTRU;
    transmit the dedicated random access preamble while the maximum handover interruption timer is running, wherein a random access opportunity within the set of random access opportunities is used for transmitting the dedicated random access preamble while the maximum handover interruption timer is running; and
    initiate a contention-based random access procedure on a condition the maximum handover interruption timer expires.

23. The method of claim 22, wherein the dedicated random access preamble is used by at least one other WTRU during a random access opportunity that is not within the indicated set of random access opportunities but that is within the period of time during which the WTRU can use the dedicated random access preamble.

24. The method of claim 22, wherein the indication of the set of random access opportunities indicated to the WTRU corresponds to a single random access opportunity.

25. The method of claim 22, further comprising transmitting a random access channel (RACH) message 3 (msg3).

* * * * *